United States Patent
Weilein et al.

(12) 
(10) Patent No.: US 6,453,626 B1
(45) Date of Patent: Sep. 24, 2002

(54) NON-CORROSIVE CONTAINMENT VAULT

(75) Inventors: Daniel A. Weilein, Cedar Falls; Douglas L. Sevey, Waterloo, both of IA (US)

(73) Assignee: Pangeaa Interment Systems, Inc., Cedar Falls, IA (US)

( * ) Notice: Subject to any disclaimer, the term of this patent is extended or adjusted under 35 U.S.C. 154(b) by 0 days.

(21) Appl. No.: 09/513,537

(22) Filed: Feb. 25, 2000

(51) Int. Cl.$^7$ ............................................... E04H 13/00
(52) U.S. Cl. ............................ 52/139; 52/140; 27/35; 27/30
(58) Field of Search ........................ 27/1, 2, 26, 30, 27/35; 52/139, 140

(56) References Cited

U.S. PATENT DOCUMENTS

| | | |
|---|---|---|
| 188,014 A | 3/1877 | Holmes |
| 692,067 A | 1/1902 | Okey |
| 1,014,614 A | 1/1912 | St. Clair |
| 2,655,714 A | 10/1953 | Rench ........................... 27/35 |
| 2,783,523 A | 3/1957 | Halley |
| 2,806,278 A | 9/1957 | Crump |
| 2,835,955 A | 5/1958 | Snyder |
| 2,848,780 A | 8/1958 | Gosnell |
| 2,940,156 A | 6/1960 | Cook ........................... 27/35 |
| 2,974,390 A | 3/1961 | Nelson |
| 3,038,232 A | 6/1962 | Wean ........................... 27/35 |
| 3,159,901 A | 12/1964 | Harrington et al. |
| 3,164,880 A | 1/1965 | Hotchkiss |
| 3,172,183 A | 3/1965 | Bugg |
| 3,208,186 A | 9/1965 | Fulton et al. |
| 3,230,674 A | 1/1966 | Christensen |
| 3,283,386 A | 11/1966 | Cenegy ........................... 27/3 |
| 3,295,179 A | 1/1967 | Behrendt |
| 3,383,260 A | 5/1968 | Mojonnier |
| 3,406,229 A | 10/1968 | Cenegy |
| 3,439,461 A | 4/1969 | Chandler et al. |
| 3,464,171 A | 9/1969 | Chandler et al. |
| 3,541,747 A | 11/1970 | Olson et al. |

(List continued on next page.)

FOREIGN PATENT DOCUMENTS

| | | |
|---|---|---|
| DE | 2044967 | 10/1971 |
| FR | 2694777 | 2/1994 |
| GB | 574657 | 1/1946 |
| GB | 1488999 | 10/1977 |

*Primary Examiner*—Beth A. Stephan
*Assistant Examiner*—Chi Nguyen
(74) *Attorney, Agent, or Firm*—Boyle, Fredrickson, Newholm, Stein & Gratz, S.C.

(57) ABSTRACT

A sealed underground containment vault has an outer shell made of non-biodegradable plastic such as polyurethane or polypropylene. The vault has a containment compartment defined by a bottom wall, and sidewalls and endwalls extending upwardly from the bottom wall. A container, such as a casket, is placed within the lower containment compartment. The outer shell for the lower containment compartment has an upper edge portion that extends completely around the upper edge of the lower compartment. A fusible element, such as an outwardly extending plastic flange, is provided around the upper edge portion completely around the lower containment compartment. A cover for the vault has an outer shell that includes a lower edge portion, which likewise has a fusible element extending completely around the lower edge portion of the cover. The fusible element on the outer shell for the cover mates with the fusible element of the outer shell on the lower containment compartment when the cover is placed on the lower containment compartment. Heat and pressure are applied to the mated fusible elements to weld them together, thereby creating a permanent water-tight and air-tight seal. The lower containment compartment and cover preferably have an inner and outer shell with foam filled in between the inner shell and the outer shell, and also a frame structure between the inner shell and the outer shell.

19 Claims, 7 Drawing Sheets

U.S. PATENT DOCUMENTS

| | | | |
|---|---|---|---|
| 3,545,055 A | 12/1970 | Pare | |
| 3,839,768 A | 10/1974 | McQuestion | 27/35 |
| 3,868,799 A | 3/1975 | Hayward | |
| 3,945,094 A | 3/1976 | Daran et al. | |
| 3,964,140 A | 6/1976 | Gauchard | |
| 4,044,435 A | 8/1977 | Acton | |
| RE29,532 E | 2/1978 | Zwick | |
| 4,143,494 A * | 3/1979 | Abbate | 52/139 |
| 4,154,031 A | 5/1979 | Williamson, Jr. | |
| 4,253,220 A | 3/1981 | Work | |
| 4,261,083 A | 4/1981 | Darby et al. | 127/35 |
| 4,328,606 A | 5/1982 | Nunes | |
| 4,351,091 A | 9/1982 | Goodkin | |
| 4,463,484 A | 8/1984 | Valle Arizpe | |
| 4,727,632 A | 3/1988 | Yearsley | |
| 4,743,320 A | 5/1988 | Shaw | |
| 4,759,105 A | 7/1988 | Buerosse | |
| 4,800,631 A | 1/1989 | Pellmann | |
| 4,924,565 A | 5/1990 | Rathjen | |
| RE33,636 E | 7/1991 | Yearsley | |
| 5,121,529 A | 6/1992 | McClure | |
| 5,245,733 A | 9/1993 | Goria | 27/35 |
| 5,321,873 A | 6/1994 | Goria | 27/35 |
| 5,381,591 A | 1/1995 | Ponger et al. | 27/35 |
| 5,404,627 A | 4/1995 | Shepherd | 27/2 |
| 5,471,718 A | 12/1995 | Harrill | 27/7 |
| 5,485,661 A | 1/1996 | McClure | 27/7 |
| 5,548,880 A | 8/1996 | Harb | 27/2 |
| 5,568,677 A | 10/1996 | Tobin | 27/17 |
| 5,592,723 A | 1/1997 | Leijonhufvud et al. | 27/2 |
| 5,611,125 A | 3/1997 | Williams et al. | |
| 5,722,133 A | 3/1998 | Farris et al. | 27/17 |
| 5,870,862 A | 2/1999 | Gordon | 52/128 |
| 5,960,524 A * | 10/1999 | Darby et al. | 27/35 |
| 6,170,201 B1 | 1/2001 | Mason et al. | |

\* cited by examiner

NON-CORROSIVE CONTAINMENT VAULT

FIELD OF THE INVENTION

The invention relates to the permanent sealing of underground containment vaults. It is particularly useful in connection with burial vaults of the type containing caskets.

BACKGROUND OF THE INVENTION

If caskets are buried without being placed in a rigid burial vault, sink holes are often created when the casket decomposes and crushes under the weight of the soil. In order to prevent sink holes, many cemeteries use concrete burial vaults into which the casket is placed for burial. Although concrete burial vaults prevent sink holes, concrete burial vaults are heavy and difficult to use. They are also not particularly effective in preventing the leaching of contaminants from decomposed caskets. Ground water contamination near cemeteries is often a significant problem.

In the past some have attempted to line concrete burial vaults with plastic liners or the like. These techniques have not been terribly effective. Others have attempted to manufacture reinforced plastic burial vaults. Reinforced plastic burial vaults are lightweight, yet can normally be manufactured with appropriate strength to withstand the weight of the soil. Even with reinforced plastic burial vaults, however, moisture can enter through the seam between the cover and the lower compartment. The moisture accelerates decomposition from within the vault.

SUMMARY OF THE INVENTION

The invention is a sealed underground containment system that is particularly useful in protecting the environment (including ground water) from contamination due to decomposed contents within the vault. As mentioned, the invention is particularly useful as a burial vault, although it can be used for other kinds of underground containment.

The invention comprises a lower containment compartment and a cover, both preferably made from non-biodegradable plastic such as polyurethane or polypropylene. The container compartment has a bottom wall, and sidewalls and endwalls that extend upwardly from the bottom wall. The lower container compartment includes an upper edge portion that extends peripherally around the upper edge of the container compartment. A fusible element, such as an outwardly extending plastic flange, is provided around the upper edge portion completely around the container compartment. The cover includes a lower edge portion, which likewise has a fusible element extending completely around the lower edge portion of the cover. The fusible element on the cover mates with the fusible element on the container compartment when the cover is placed on the container compartment. The application of heat and pressure to the mated fusible elements welds the fusible elements together, thereby creating a permanent water-tight and air-tight seal. The underground container is thus sealed completely and permanently, thereby better protecting the surrounding environment. When the invention is used in connection with burial vaults, it is particularly effective in slowing decomposition. The rate of decomposition is slowed primarily by preventing water and/or air from penetrating into the vault.

It is preferred to weld the fusible elements together as an integral piece rather than attach the two merely with glue or adhesive. Glue or adhesive often degrades prematurely, especially in the cold, thus leading to premature leakage.

In order to withstand the enormous weight of soil and possibly equipment maneuvering on the ground, it is preferred that the container compartment be comprised of an inner shell glued to an outer shell with foam filling the space therebetween in order to provide structural stability. Preferably, the foam adheres to the inner and the outer shell. It is also preferred that a frame structure be provided between the inner and outer shell for reinforcement. The cover preferably has a similar construction. In one embodiment of the invention, the space between the inner and the outer shell at the bottom wall of the container compartment is left void or empty prior to burial. With this configuration, the vaults are relatively lightweight and can be conveniently moved by a single person. In circumstances where it is important that the vault have significant weight, such as in areas prone to flooding, ballast material such as sand or concrete can be used to fill the void in the bottom wall. In these circumstances, a plug or patch on the outer shell for the bottom wall can be spin-welded to seal the shell after the ballast is added.

In a preferred embodiment of the invention, the mating fusible elements on the upper edge portion of the container compartment and the lower edge portion of the cover comprise flanges that extend outwardly from the edge and completely around the vault (i.e., completely around the container compartment and the cover, respectively). In accordance with the preferred embodiment of the invention, a specialized welding tool is provided for optimum application of heat and pressure to weld the fusible elements together. The preferred welding tool has two sections, each connected by a hinge and a latch to allow the tool to circumvent the vault, and completely cover and engage the mated fusible elements around the periphery of the vault. The welding tool has two heating elements which are separated to allow for insertion of the mated fusible flanges. The heating elements are positioned within a C-shaped bar. An upper air pump is located between an upper extension of the C-shaped bar and an upper heating element, while a lower air pump is located between the lower extension of the C-shaped bar and the lower heating element. Insulation is provided between the air pumps and the respective heating elements.

When the vault is ready to be sealed, a worker places the welding tool around the vault and in engagement with the fusible flanges. The worker then activates the welding tool which heats the heating elements to approximately 400°–600° F. while at the same time provides pneumatic pressure to the air pumps, thereby forcing the heating elements together and causing the fusible flanges to weld together.

In another embodiment, the invention involves the use of a resistance heating element, such as a wire, extending completely around the burial vault and being located between the fusible element for the cover and the fusible element for the containment compartment. When the cover is placed on the containment compartment, electrical power is supplied to the resistance heating element, thereby causing the fusible elements to weld together. The resistance heating element remains an integral component of the vault after sealing.

Other advantages and features of the invention should be apparent to those skilled in the art after inspecting the drawings and the following description thereof.

DETAILED DESCRIPTION OF THE DRAWINGS

FIGS. 1–9 show a non-corrosive containment vault 10 in accordance with a first embodiment of the invention. The containment vault 10 shown in the drawings is a burial vault having an interior compartment sized to contain a casket for permanent underground burial.

Figure 1:
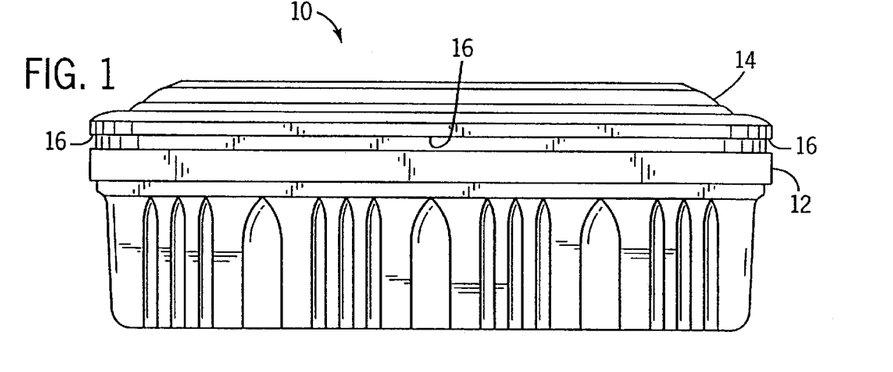
FIG. 1 is a side elevational view of the non-corrosive containment vault constructed in accordance with a first embodiment of the invention.
Figure 2:
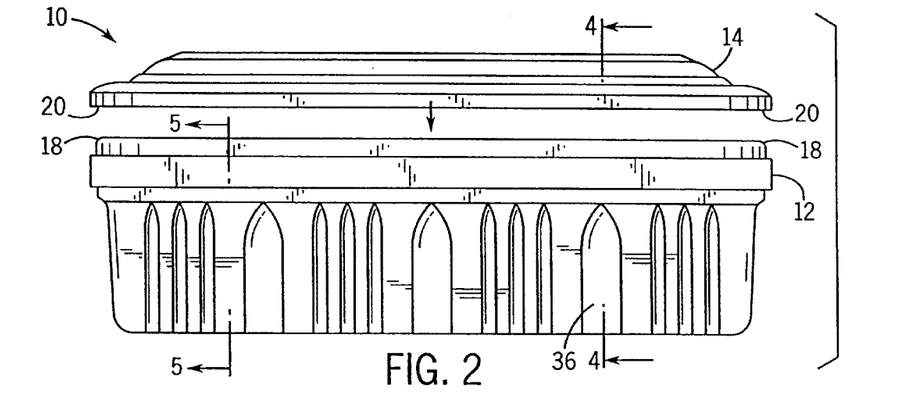
FIG. 2 is a side elevational view similar to FIG. 1 showing a cover of the containment vault lifted from a lower containment compartment for the vault.

Referring to FIGS. 1 and 2, the containment vault 10 includes a lower containment compartment 12 and a cover 14. Both the lower containment compartment 12 and the cover 14 are constructed to be lightweight such that it is convenient for a single person to move the components 12, 14 when the containment vault 10 is empty. FIG. 2 shows the cover 14 separated from the lower containment compartment 12, which is the manner in which the components 12, 14 are provided prior to use. The cover 14 fits on top of the lower containment compartment 12 to define a top of a container receiving volume 28 within the lower containment compartment 12. FIG. 1 shows the cover 14 in place on the lower containment compartment 12. As mentioned, one of the primary aspects of the invention involves the permanent sealing of seam 16 between the upper peripheral edge 18 of the lower containment compartment 12 and the lower peripheral edge 20 of the cover 14 which extends completely around the vault 10.

Figure 3:
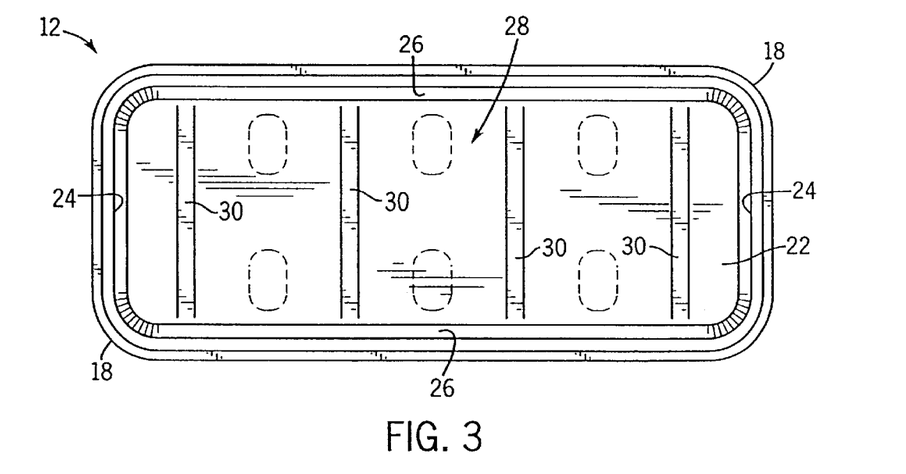
FIG. 3 is a top plan view of the containment vault shown in FIG. 1.

FIG. 3 is a top plan view of the lower containment compartment 12. The lower containment compartment 12 has a bottom wall 22, as well as endwalls 24 and sidewalls 26 that extend upwardly from the bottom wall 22. The bottom wall 22, endwalls 24 and sidewalls 26 define the container receiving volume 28 into which a container such as a casket is placed. The bottom wall 22 includes four spaced-apart, parallel lands 30. The lands 30 are slightly raised above the remainder of the surface of the bottom wall 22. The lands 30 provide a platform on which the container or casket is placed within the container receiving volume 28.

Figure 4:
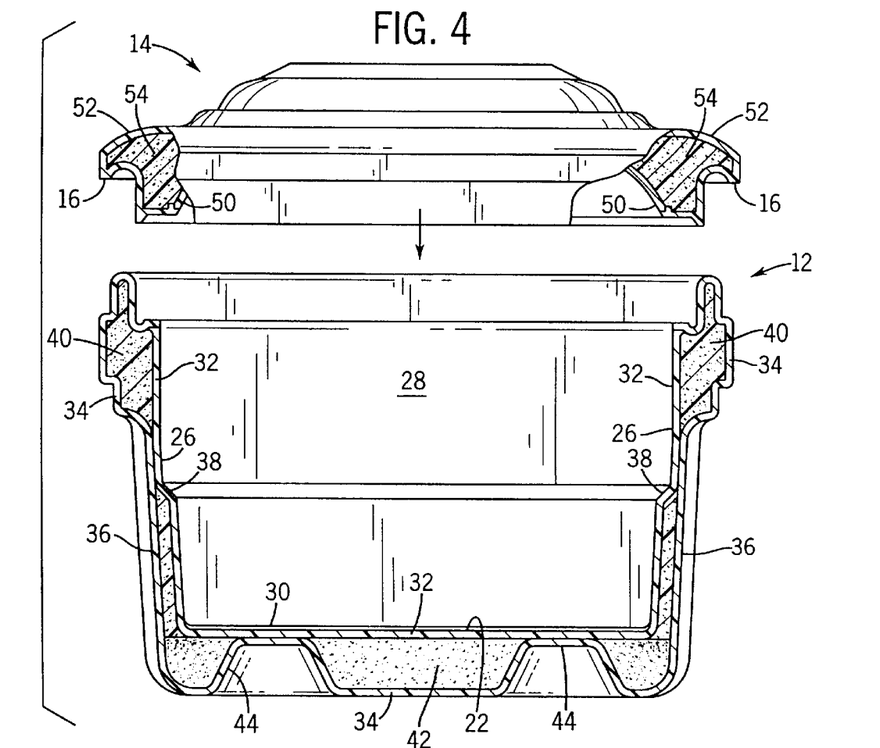
FIG. 4 sectional view taken along line 4—4 in FIG. 2.
Figure 5:
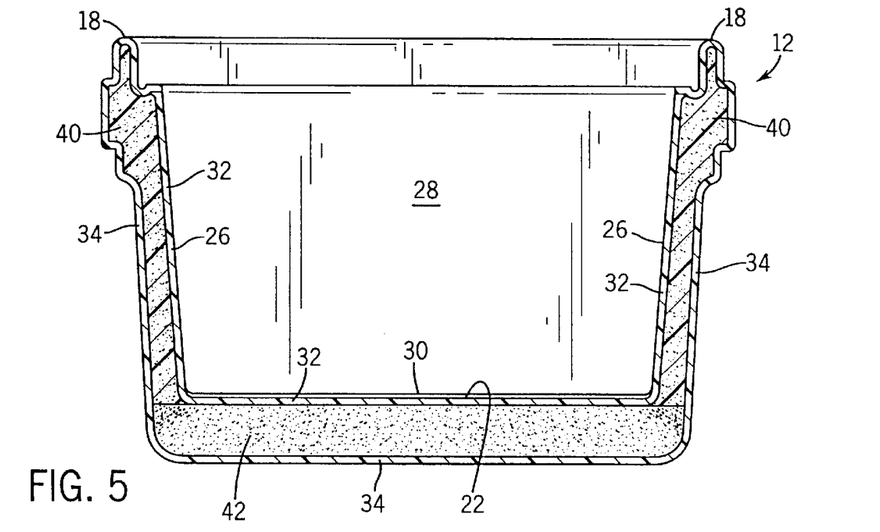
FIG. 5 is a sectional view taken along line 5—5 in FIG. 2.
Figure 9:
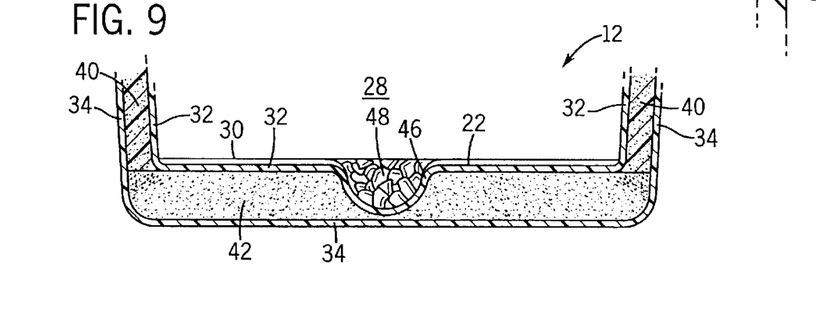
FIG. 9 is a view similar to FIG. 5 illustrating the optional use of an absorbent material within the internal compartment within the containment vault.

Referring to FIGS. 4 and 5, the separate components 12, 14 of the containment vault 10 are preferably constructed to be lightweight using non-biodegradable polymeric shells 32, 34 with foam 40 filling the space therebetween. More specifically, the lower containment compartment 12 includes an inner shell 32 that defines the shape of the container receiving volume 28 within the lower containment compartment 12. The lower containment 12 also includes a separate outer shell 34 that surrounds the inner shell 32. In general, the outer shell 34 is spaced apart from the inner shell 32. The shells 34, 32 are preferably made of vacuum-formed polypropylene. The shells are formed to contain ridges and indentations, especially along the endwalls 24 and the sidewalls 26. For example, the inner shell 32 includes horizontal ridge 38 which preferably circumvents the entire container volume 28. Also, the outer shell 34 contains vertical indentations such as indentations 36 as shown in FIGS. 2 and 4. Such ridges 38 and indentations 36 help to strengthen the shells 32, 34 which is important so that the containment vault can withstand heavy weight loads. Preferably, foam material fills the space between the inner shell 32 and the outer shell 34 in the sidewalls 26 and endwalls 24 of the lower containment compartment 12. The foam material can be polystyrene, even in bead form, although it is preferred that the foam be a polyurethane foam that is injected between the shells 32, 34 and adheres to the surfaces of the inner shell 32 and the outer shell 34. The space between the inner shell 32 and the outer shell 34 in the bottom wall 22 of the lower containment compartment 12 can also be filled with foam. Alternatively, the space in the bottom wall 22 can be left empty, thus enabling the space in the bottom wall 22 to be filled onsite with ballast materials 42, such as sand or cement. A plug or patch on the outer shell 34 in the bottom wall 22 can be spin welded to seal the outer shell 34 after the ballast material 42 is added. Note that the outer shell 34 in the bottom wall 22 is formed to provide stand-offs 44 that support the inner shell 32 of the bottom wall 22 when the space between the inner shell 32 and the outer shell 34 in the bottom wall 22 is empty. Referring to FIG. 9, it may be desirable that the inner shell 32 for the bottom wall 22 of the lower containment compartment 12 be formed to provide a longitudinal well 46. The well 46 can then be filled with desiccant material 48 that absorbs moisture within-the container receiving volume 28 after the vault 10 is sealed.

Referring to FIG. 4, the cover 14 is preferably constructed of an inner shell 50 and an outer shell 52 with foam 54 filling the space therebetween.

Figure 6:
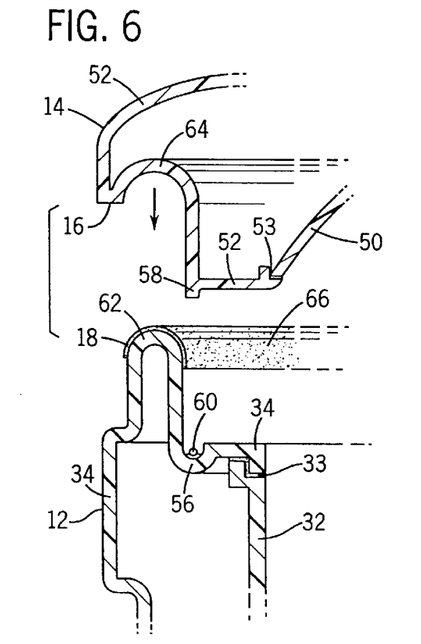
FIGS. 6–8 are detailed views of the peripheral edge portions of the containment compartment and cover of the embodiment of the invention shown in FIG. 1, which illustrate the use of a resistance heating element to weld fusible elements on the lower compartment and the cover together to create a water-tight seal.
Figure 7:
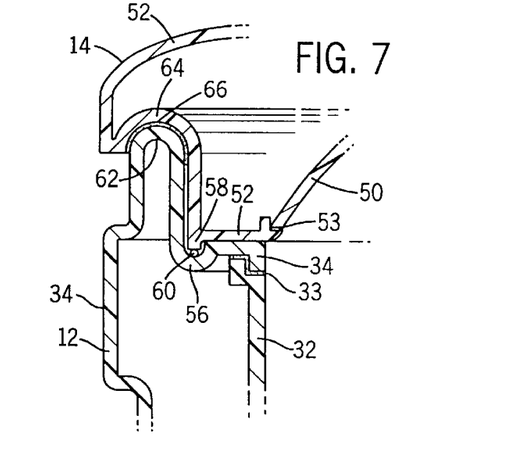
Figure 8:
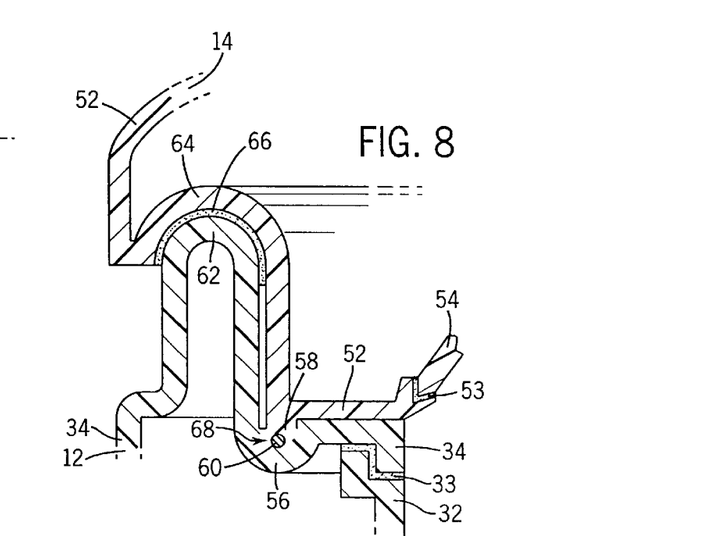

Referring now to FIGS. 6–8, the inner shell 32 is secured to the outer shell 34 using adhesive at a junction 33. The preferred adhesive is able to withstand wide temperature fluctuations and is preferably premium grade butyl-based sealant, such as is available from Adco of Michigan Center, Mich. under its designation ST-30. In a similar manner, the inner shell 54 for the cover 14 is secured to the outer shell 52 of the cover 14 at junction 53, again using adhesive. The lower containment compartment 12 and the cover 14 are then filled with foam 40.

The lower containment compartment 12 has an upper edge portion 18 that extends completely around an upper periphery of the containment compartment 12. The cover 14 includes a lower edge portion 16 that extends completely around the lower periphery of the cover 14. The upper edge portion 18 includes a fusible portion 56 that extends completely around the upper edge 18 of the containment compartment 12 and is designed to fuse together with a mating fusible portion 58 on the cover 14 when heat and/or pressure is applied. The entire upper edge portion 18 of the lower containment compartment 12 and the entire lower edge portion 16 of the cover 14 are designed to have mating configurations which facilitate registration of the cover 14 on the lower containment compartment 12. Referring in particular to FIG. 6, the upper edge portion 18 of the lower containment compartment 12 has an arched, convex adhesive application region 62. The lower edge portion 16 of the cover 14 has a mating, concave, arched portion 64. Moving inward, the outer shell 34 for the lower containment compartment 12 extends downward towards fusible portion 56 which is in the shape of a gutter. A heat-resistant element 60, such as a nickel coated steel wire, available from Kanthal Corporation of Bethel, Conn. under its designation Nickrothal, is laid in the well 56. The lower edge portion 16 of the cover 14 has a complementary configuration, and fusible element 58 on the outer shell 52 for the cover 14 is designed to reside within the gutter 56 on the outer shell 34 of the lower containment compartment 12.

FIG. 6 shows the cover 14 before it is placed on the lower container compartment 12. Note that the inner shell 32 for the lower container compartment 12 has already been secured to the outer shell 34. Likewise, the inner shell 54 for the cover 14 has already been secured to the outer shell 52. In addition, adhesive 66 has been applied to the arched portion 62 of the upper peripheral edge 18 of the lower containment compartment 12. Preferably, adhesive 66 is applied around the entire upper peripheral edge 18. FIG. 7 shows the cover 14 placed on the lower containment compartment and in particular, shows fusible element 58 on the cover 14 residing within fusible gutter 56 on the lower containment compartment 12 with the electric resistance heater 60 therebetween. FIG. 7 also shows adhesive 66 applied to adhere arched portion 64 on the cover 14 to the arched portion 62 on the lower containment compartment 12. In FIG. 7, the heat resistance element 60 has not yet been activated to weld fusible element 58 on the cover 14 together with the fusible well 56 on the lower containment compartment 12. FIG. 8 shows the structure after the heat resistance element 60 has been activated to weld the fusible element 58 on the cover 14 together with the fusible well 56 on the lower container compartment 12. Note that the adhesive junction 33, which secures the inner shell 32 of the lower containment compartment 12 to the outer shell 34, is located internally to the weld 68. Likewise, adhesive junction 53, which secures the inner shell 54 of the cover 14 to the outer shell 52, is also located internal to the weld 68. The weld 68 fuses together fusible elements 56, 58, which are part of the respective outer shells 34, 52 of the lower containment compartment 12 and the cover 14, entirely around the vault 10, thereby rendering a water-tight and air-tight seal. The heat resistance element 60 remains integral with the vault 10.

FIGS. 10–14 show a non-corrosive containment vault 110 constructed in accordance with a second embodiment of the invention. In many ways, the containment vault 110 shown respect to FIGS. 10–14 is similar to the vault 10 described with respect to FIGS. 1–9. The containment vault 110 described in connection with the second embodiment has two primary distinctions compared to the containment vault 10 described in connection with the first embodiment. The first distinctive feature is the presence of a rigid frame structure 176 that is located between the inner and outer shells of the lower compartment 112 and cover 114 in the second embodiment 110. The second distinctive feature is the manner in which the edge portion 118 of the lower container compartment 112 and the edge portion 116 of the cover 114 are fused together. Either or both of these features described with respect to the second embodiment 110 can be used in connection with the first embodiment 10, as desired.

Figure 10:
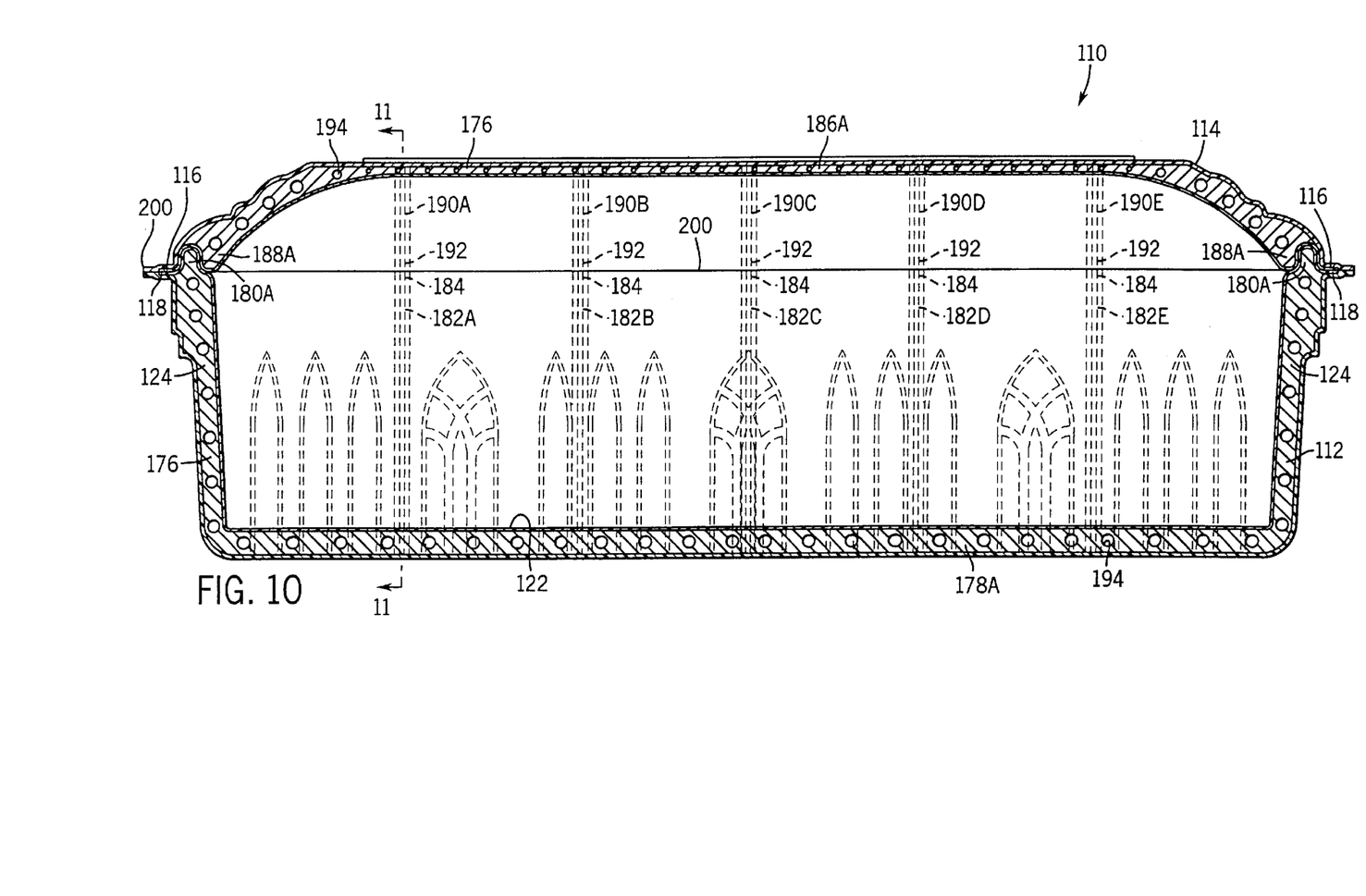
FIG. 10 is a side elevational view of a containment vault in accordance with a second embodiment of the invention, which schematically illustrates various components of a metal frame structure used to provide additional structural stability to the containment vault.
Figure 11:
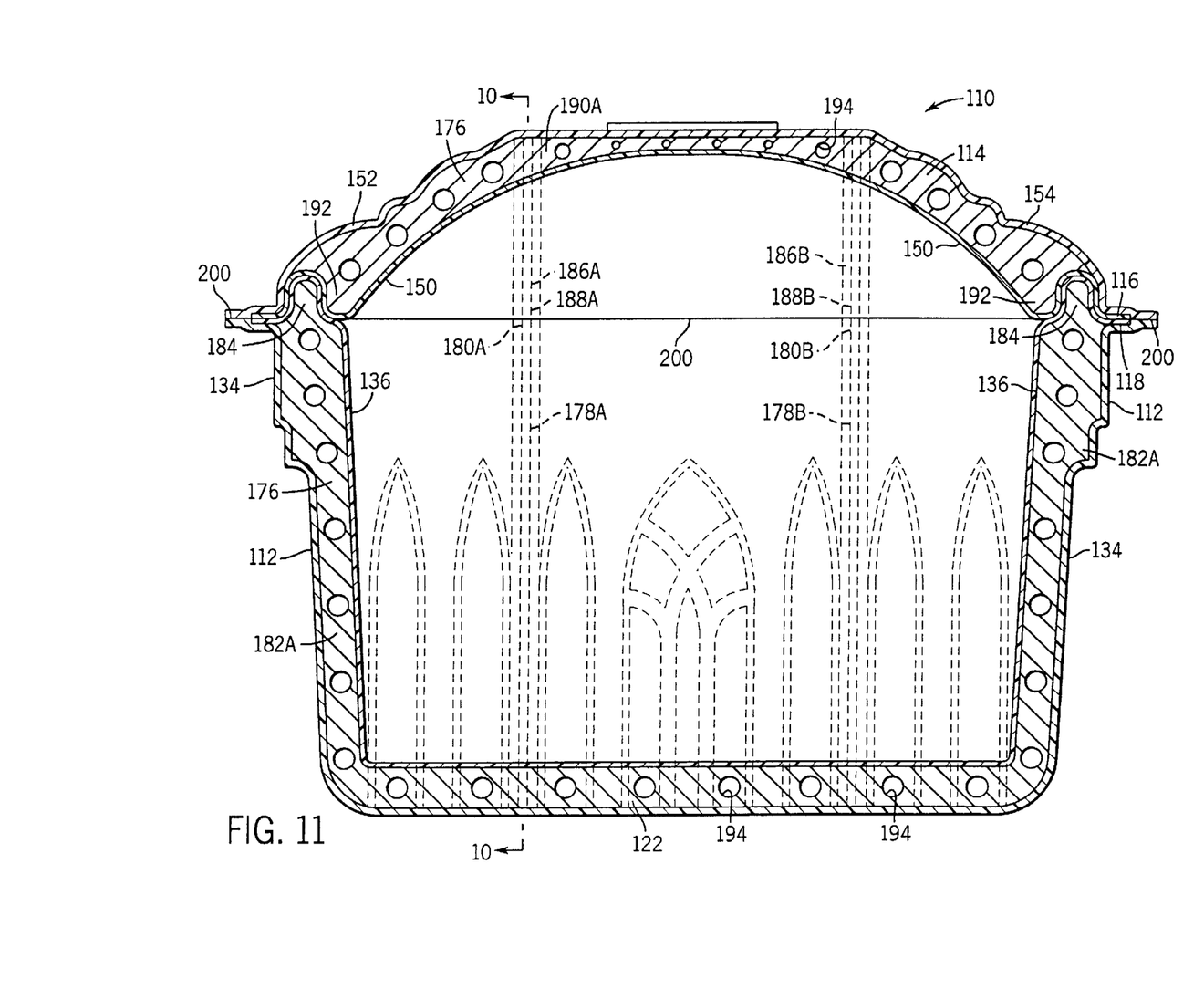
FIG. 11 is an elevational view taken from an end of the containment vault shown in FIG. 10, which also illustrates components of a metal frame structure in accordance with the embodiment of the invention.

Referring now to FIGS. 10 and 11, the frame structure 176 includes several intersecting frame members each preferably made from metal, and each preferably having a T-shaped cross-section. The lower containment compartment 112 has two longitudinal frame members 178a, 178b. Each longitudinal frame member 178a, 178b spans the entire longitudinal length of the bottom wall 122 and extends upward along the entire length of the endwalls 124. The longitudinal frame members 178a, 178b have ends 180a, 180b that reside within the upper edge portion 118 of the lower compartment 112. The lower compartment 112 also includes five transverse frame members 182a, 182b, 182c, 182d, 182e. The transverse frame members 182a, 182b, 182c, 182d, 182e are generally equally spaced along the length of the lower containment compartment 112, and intersect with the longitudinal frame members 178a, 178b within the bottom wall 122. The frame members 178a, 178b and 182a, 182b, 182c, 182d, 182e are interconnected (e.g. welded) at the intersections to form the frame structure that is laid within the outer shell 134 for the lower containment compartment 112 prior to securing the inner shell 136. The transverse frame members 182a, 182b, 182c, 182d, 182e have ends 184 that reside within the upper edge portion 118 of the lower containment compartment 112.

In a similar manner, the cover 114 includes longitudinal support members 186a and 186b. The longitudinal support members 186a, 186b for the cover 114 have ends 188a, 188b that are aligned with the ends 180a, 180b of the longitudinal frame members 178a, 178b of the lower containment compartment 112. The cover 114 also includes transverse frame members 190a, 190b, 190c, 190d and 190e. The transverse frame members 190a, 190b, 190c, 190d, and 190e in the cover 114 are spaced apart, and have ends 192 that are aligned with the ends 184 of the transverse frame members 182a, 182b, 182c, 182d, 182e for the lower containment compartment 112. The alignment of the respective frame members when the cover 114 is placed on the lower containment compartment 112 creates a frame structure 176 with considerable strength, which can be especially important for supporting the tremendous weight of soil or the like on top of the containment vault 110.

It is preferred that the frame members be fabricated to generally fit snugly between the outer shell 134 and the inner shell 136. It is also preferred that the frame members contain flow holes or openings 194 to allow foam to flow freely throughout the spaces between the inner shell 136 and outer shell 134 of the lower containment compartment 112 and the inner shell 150 and outer shell 152 of the cover 114. While it is preferred that the frame members be constructed of steel, plastic frame members may be suitable in some circumstances.

Figure 12:
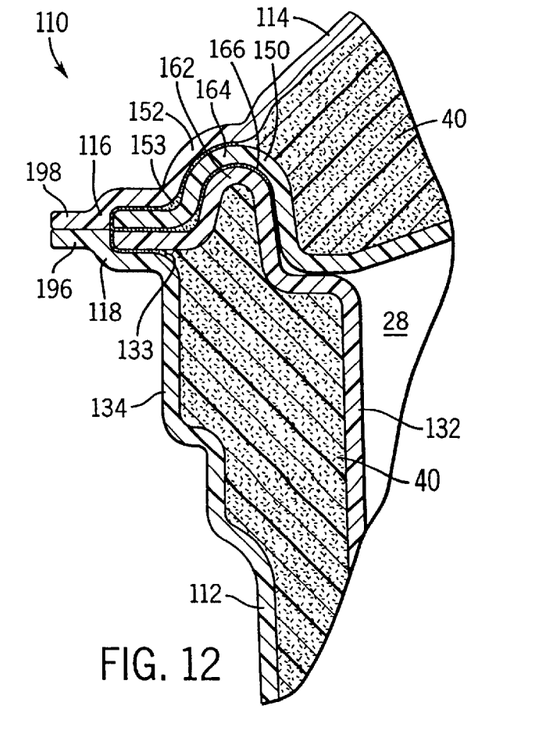
FIG. 12 is a detailed view illustrating the preferred configuration of fusible elements along the upper peripheral edge of the lower containment compartment and the lower peripheral of the cover, respectively.

Referring now to FIG. 12, the configuration of the upper peripheral edge 118 of the lower containment compartment 112 and the lower peripheral edge 116 of the cover 114 are somewhat different in the second embodiment 110 than in the first embodiment 10. More specifically, the upper edge portion 118 of the lower containment compartment 112 includes an outwardly extending flange 196 that extends outwardly from the interior of the vault 110 and completely around the vault 110. Likewise, the lower edge portion 116 of the cover 114 contains an outwardly extending flange 198 that extends outwardly and completely around the lower edge of the cover 114. The outwardly extending flanges 196, 198 shown in FIG. 12 constitute fusible elements which are welded together to seal the vault 110.

Before the cover 114 is placed on the lower containment compartment 112, the inner shell 132 for the lower containment compartment 112 is secured to the outer shell 134 along adhesive junction 133. Also, the inner shell 150 for the cover 114 is secured to the outer shell 152 along adhesive junction 153. The inner shells 132 and 150 are secured to the respective outer shell 134, 152 after the respective frame elements have been laid therein. Thereafter, foam 40 is added in the space between the shells. At the burial site, it is preferred to apply adhesive 166 on arched portion 162 for the lower containment compartment, and then place the cover 114 thereon so that mating arched portion 164 is secured thereon with the adhesive 166 therebetween.

Figure 13:
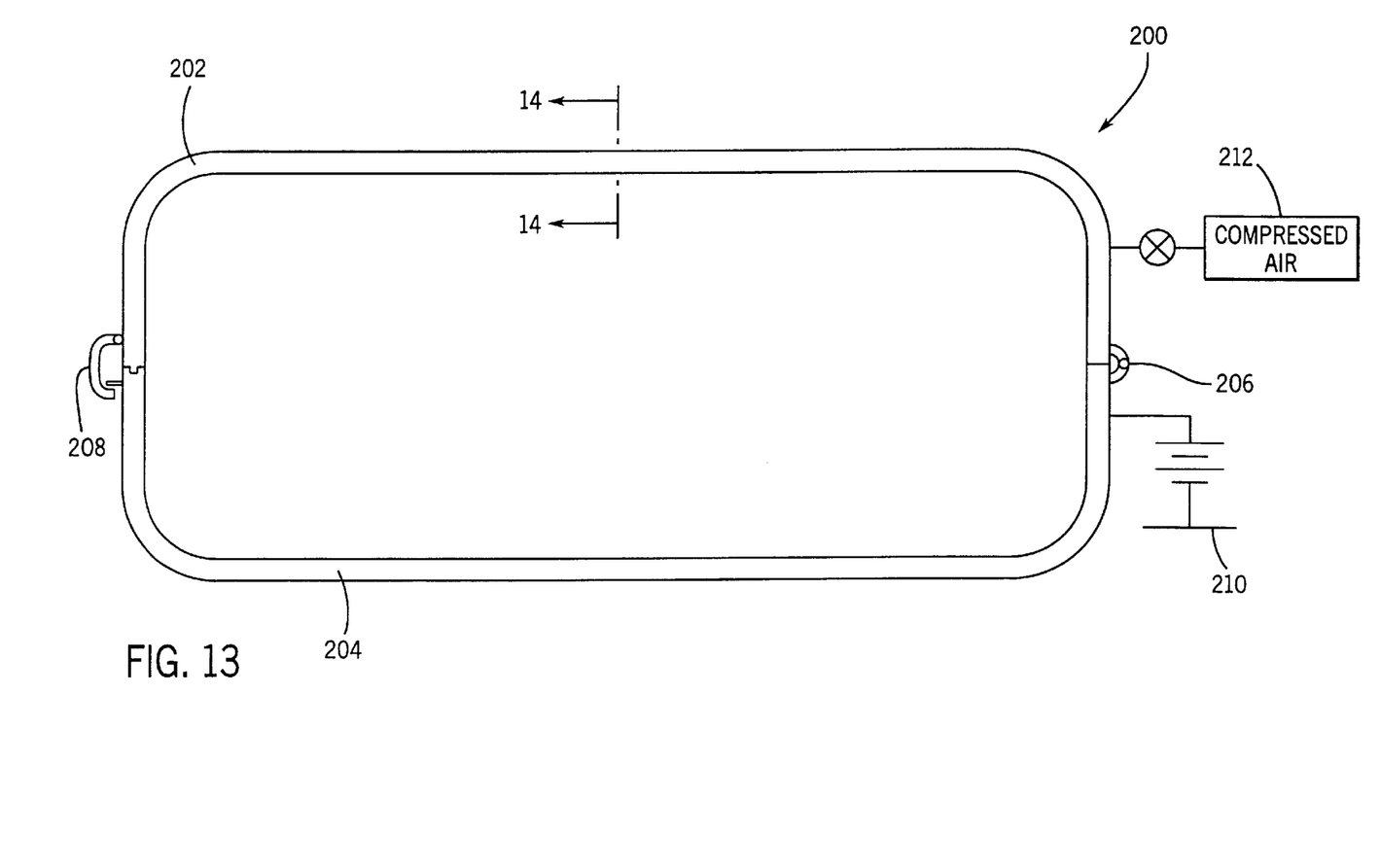
FIG. 13 is a schematic drawing illustrating the use of a welding tool used to seal the containment vault having outwardly extending flanges as illustrated on the vault in FIGS. 10–12.
Figure 14:
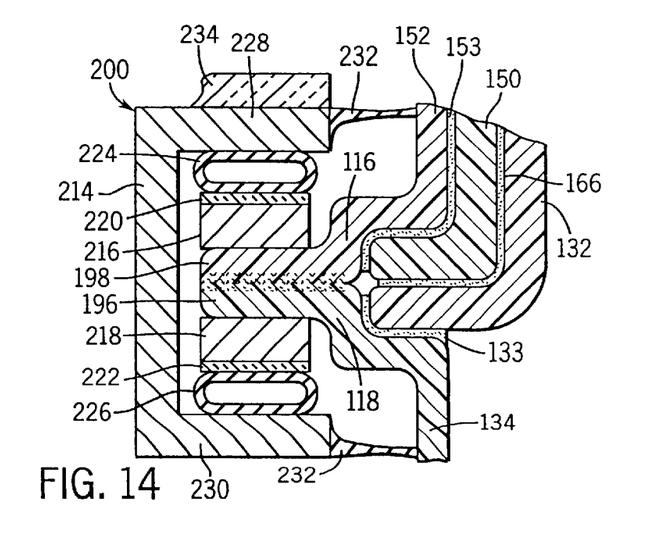
FIG. 14 is a sectional view taken along line 14—14 in FIG. 13.

The outwardly extending flanges 196, 198, shown in FIG. 12, are bonded together using a welding tool 200 such as is shown in FIGS. 13 and 14. In its preferred embodiment, the welding tool 200 includes two sections 202, 204 that are connected at one end by a hinge 206 and at the other end by latching mechanism 208 when the welding tool 200 is closed for operation. The welding tool 200 receives electrical power from a power source 210 such as an on-site generator or commercially available power. The preferred welding tool 200 also uses compressed air 212 to pneumatically force together the outwardly extending flanges 196, 198 during the welding process. Referring in particular to FIG. 14, both of the sections 202 and 204 of the welding tool 200 have a metal bar 214 that has a C-shaped cross-section. The C-shaped bar is shaped so that the bar 214 fits snugly around the vault 110 and engages the mating outwardly extending flanges 196, 198 when the welding tool 200 is closed for operation, see FIGS. 10 and 11. Still referring to FIG. 14, the welding tool 200 includes an upper heating element 216 and a lower heating element 218. The heating elements 216, 218 are rectangular resistance heating elements capable of obtaining 400° F. to 600° F. The upper heating element 216 includes an insulation layer 220 and the lower heating element 218 includes an insulation layer 222. Suitable heating elements 216, 218 can be purchased from Ogden Manufacturing of Arlington Heights, Ill. under its designation Incoloy. The welding tool 200 also includes an upper air pump element 224 and a lower air pump element 226. The upper air pump element 224 is located between the upper extension 228 of the C-shaped bar and the upper heating element 216. The lower air pump 226 is located between the lower extension 230 on the C-shaped bar 200 and the lower heating element 218. As shown in FIG. 14, the welding tool 200 is placed on the vault 110 such that the outwardly extending flanges 196, 198 are engaged within the space between the upper heating element 216 and the lower heating element 218. With welding tool 200 so engaged, compressed air is provided to the air pumps 224, 226 to force the heating elements 216, 218 towards one another. This in turn applies pressure to squeeze the outwardly extending flanges 196, 198 together. Electrical power is also provided to the upper heating element 216 and the lower heating element 218, which heats the heating elements 216, 218 to weld the outwardly extending flanges 196, 198 together, thus forming a water-tight seal completely around the vault 110.

Inasmuch as the welding tool 200 may need to be used during inclement weather, it is desirable to provide seals 232 at the ends of the extensions 228, 230 of the C-shaped bar 214. The seals 232 will help prevent rain water or snow from entering within the area of the upper and lower heating elements. FIG. 14 also schematically illustrates the use of an insulation blanket 234 which can be mounted around the C-shaped bar 214 to protect the users.

It should be apparent to those skilled in the art that containment vaults constructed in accordance with the first embodiment 10 or the second embodiment 110 of the invention are particularly effective for permanent containment of objects or containers (such as caskets) in a water and air-tight environment. In both embodiments, a permanent seal is provided by welding together a fusible element on the outer shell of the lower containment compartment and a fusible element on the outer shell of the cover. In some applications, it might not be necessary to use the inner shell for the lower containment compartment and/or the cover.

Various alternatives and other embodiments are contemplated as being within the scope of the following claims which particularly point out and distinctly claim the subject matter regarded as the invention.

We claim:

1. A burial method, comprising the steps of:
providing a lower containment compartment and a cover each being made from a heat fusible material;
wherein the lower containment compartment has a bottom wall, endwalls and sidewalls extending upwardly from the bottom wall, which cooperate to define a container receiving volume into which a container may be received, the containment compartment having an upper edge portion extending completely around an upper periphery of the containment compartment, said upper edge portion comprising a fusible element extending completely around the upper edge of the containment compartment;
wherein the cover has a lower edge portion extending completely around a lower periphery of the cover, said lower edge portion of the cover comprising a fusible element extending completely around the lower edge of the cover;
placing the cover on the power containment compartment such that the fusible element of the cover mates with the fusible element of the containment compartment when the cover is placed on the containment compartment; and
applying heat and pressure to the mated fusible elements to cause the fusible elements to fuse together, thereby creating a water-tight seal completely around the containment vault.

2. The method as recited in claim 1 wherein the container receiving volume is dimensioned to accommodate a casket and the containment vault is a burial vault.

3. The method as recited in claim 1 wherein:
the fusible element on the cover comprises an outwardly extending flange that extends outwardly and completely around the lower peripheral edge of the cover; and
the fusible element on the containment compartment comprises an outwardly extending flange that extends outwardly and completely around the upper peripheral edge of the containment compartment.

4. The method as recited in claim 1 wherein the step of applying heat to the mated fusible elements is carried out by placing a resistance heating element extending completely around the vault between the fusible element for the cover and the fusible element for the containment compartment when the cover is placed on the containment compartment.

5. The method as recited in claim 1 wherein the containment compartment comprises an inner shell that is glued to an outer shell and foam material fills space between the inner shell and the outer shell in the endwalls and sidewalls of the containment compartment.

6. The method as recited in claim 5 wherein space between the inner shell and the outer shell in the bottom wall of the containment compartment remains void and capable of being filled with ballast material.

7. The method as recited in claim 5 wherein the cover consists of an inner shell glued to an outer shell and foam fills space between the inner shell and the outer shell.

8. The method as recited in claim 1 wherein:

the upper edge portion of the containment compartment comprises an arched adhesive application portion located inward from the respective fusible element and extending completely around the upper peripheral edge of the containment compartment;

the lower edge portion of the cover includes a mating arched adhesive application portion located inward from the respective fusible element and extending completely around the lower peripheral edge of the cover; and wherein the step of placing the cover on the lower containment compartment includes engaging together the arched adhesive application portions of the upper and lower edge portions.

9. The method as recited in claim 5 wherein the foam adheres to the inner shell and the outer shell for the containment compartment, thereby providing additional structural stability.

10. A system for permanently sealing a vault comprising:

a lower container having a bottom wall, sidewalls and endwalls that extend upwardly from the bottom wall, and an upper edge portion that extends around the periphery of the container, the upper edge portion containing an outwardly extending flange which extends outwardly from the upper edge portion and completely around the lower container;

a cover having a lower edge portion and an outwardly extending flange which extends outwardly from the lower edge portion and completely around the cover, wherein the outwardly extending flanges are made from heat fusible material and are arranged and configured to mate with each other when the cover is placed on the lower container; and a welding tool having an upper and a lower heating element that are spaced apart from one another to receive the mating flanges therebetween and means for providing force on the heating elements to push the heating elements towards one another, wherein the vault is permanently sealed using the welding tool to apply heat and pressure to weld together the mating flanges completely around the periphery of the vault.

11. A system as recited in claim 10 wherein the welding tool is sized and configured to extend completely around the periphery of the vault along the mating flanges.

12. A system as recited in claim 10 wherein said means for applying force to the heating elements comprises a bar having a C-shaped cross-section, an upper air pump element located between a top extension of the C-shaped bar and the upper heating element and a lower air pump element located between a lower extension of the C-shaped bar and the lower heating element.

13. The system as recited in claim 12 wherein insulation is located between the respective air pumps and heating elements.

14. The system as recited in claim 11 wherein the welding tool comprises two sections connected at one end by a hinge and the other end by a latching mechanism thereby facilitating the mounting of the welding tool on the mating flanges around the periphery of the vault.

15. The system as recited in claim 10 wherein the lower container and the cover are made from polypropylene.

16. The system as recited in claim 10 wherein the vault is a burial vault and the lower container is sized to receive a casket.

17. A containment vault, comprising:

a lower member defining a bottom and upwardly extending wall structure which cooperate to define an internal cavity, and wherein the upwardly extending wall structure includes a first peripheral fusible element; and a cover adapted for placement on the lower member to enclose the internal cavity, wherein the cover includes a second peripheral fusible element which engages the first fusible element when the cover is placed on the lower member;

wherein the cover is secured to the lower member by application of heat to the first and second fusible elements, wherein the application of heat causes the first and second fusible elements to fuse together to simultaneously secure the cover to the lower member and to create a fluid-tight seal around the containment vault.

18. The containment vault of claim 17, wherein the lower member includes at least one wall formed of a heat fusible material and wherein the cover includes at least one wall formed of a heat fusible material, and wherein the first and second peripheral fusible elements comprise first and second flanges, respectively, formed integrally with the walls of the lower member and the cover, respectively.

19. The containment vault of claim 18, wherein the cover is secured to the lower member by application of heat and pressure to the first and second flanges, to fuse the first and second flanges together.

* * * * *